UNITED STATES PATENT OFFICE.

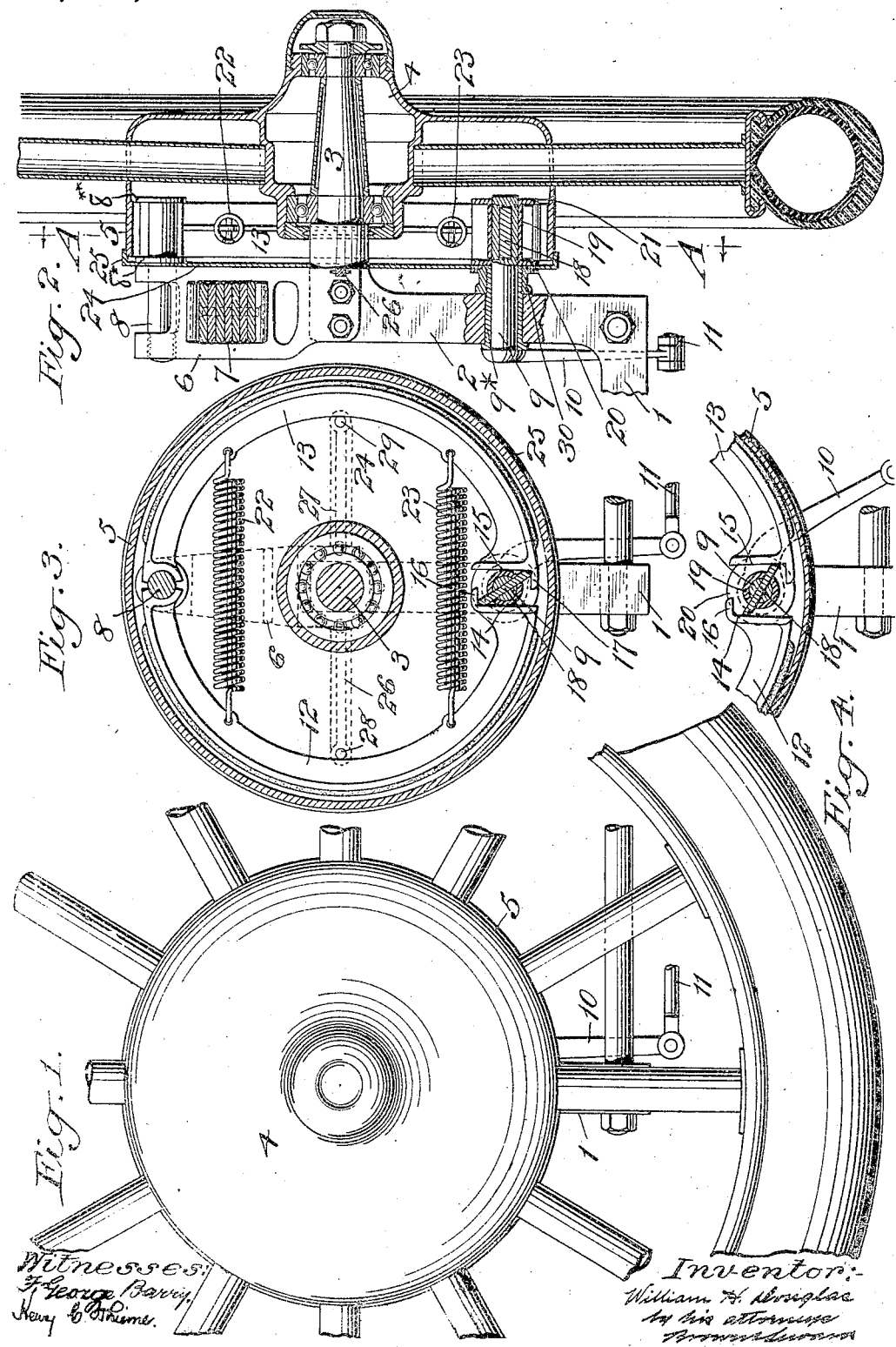

WILLIAM H. DOUGLAS, OF BELLEVILLE, NEW JERSEY, ASSIGNOR TO HEALEY & COMPANY, OF NEW YORK, N. Y., A CORPORATION OF NEW YORK.

BRAKE MECHANISM.

1,101,123. Specification of Letters Patent. Patented June 23, 1914.

Application filed October 16, 1911. Serial No. 654,997.

*To all whom it may concern:*

Be it known that I, WILLIAM H. DOUGLAS, a citizen of the United States, and resident of Belleville, in the county of Essex and State of New Jersey, have invented a new and useful Improvement in Brake Mechanisms, of which the following is a specification.

This invention relates to brake mechanisms and more particularly to internal expanding brake mechanism.

The objects of my invention are to provide a brake mechanism which will be very powerful in its action, rigid in construction and noiseless.

A practical embodiment of my invention is represented in the accompanying drawings, in which—

Figure 1 represents a portion of a vehicle wheel in side elevation embodying my invention, Fig. 2 is a transverse section through the same showing enough of the adjacent parts to clearly understand the construction, form and operation of my invention, Fig. 3 is a section taken in the plane of the line A—A of Fig. 2, showing the divided brake band in its contracted or released position, and Fig. 4 is a detail section similar to Fig. 3, showing the brake band in its expanded or braking position.

The axle herein shown is of the drop type, the lower horizontal portion being denoted by 1, the uprising arm by 2 and the laterally extended spindle by 3. The hub 4 of the wheel which is shown journaled upon the spindle 3 of the axle is provided with an inner cylindrical braking surface on its laterally extended outer flange 5. The uprising arm 2 of the drop axle is shown as provided with a bracket 6 uprising therefrom and removably secured thereto, which bracket serves the double purpose of a mounting for the vehicle spring 7 and as a support for the pivot bolt 8 of the brake band, which pivot bolt projects into the interior of the outer flange 5 of the hub of the wheel adjacent to the inner cylindrical braking surface at the top thereof. A rock shaft 9 of the brake mechanism is journaled in a sleeve 9* extending through the uprising arm 2 of the drop frame, which rock shaft has the usual arm 10 for attachment to the rod 11 leading to the shaft rocking means not shown herein.

The internal brake band is herein shown as divided into two semi-cylindrical members 12, 13, pivoted at their upper ends to the bolt 8, between the retaining circumferential flanges 8*, 8**, their lower free ends being provided with vertical parallel surfaces 14, 15, the surface 14 having at its upper end a flange 16 and the surface 15 having at its lower end a flange 17, said flanges forming keepers for the slidable block to be hereinafter described. The rock shaft 9 projects inwardly into the interior of the flange 5 of the hub adjacent to the inner cylindrical braking surface at the bottom of the said flange diametrically opposite the pivot bolt 8. This portion of the rock shaft 9 is interposed between the free ends of the members 12 and 13 of the divided brake band.

A slidable block 18 is carried by the rock shaft 9 in the present instance by providing a slot leading diametrically through said rock shaft within which the block 18 has an easy sliding fit, with the opposite ends of said block projecting a distance beyond the periphery of the said rock shaft. The free ends of this slidable block 18 engage the parallel vertical surfaces 14, 15, at the free ends of the members 12 and 13 of the divided brake band.

When the parts are in their normal position, the opposite ends of the slidable block 18 are located in the corners formed by the intersections of the parallel surfaces 14, 15, with the inner faces of the keepers 16, 17. I provide the rock shaft 9 with a spool 19, the flanges 20, 21, of which are located upon the opposite sides of the free ends of the members of the divided band and serve to prevent any lateral movement thereof. The slidable block 18 also projects through the body portion of said spool 19.

The brake band is normally held in its contracted or released position by coil springs 22, 23, the spring 22 being attached to the two members of the brake band adjacent to the pivot 8 and the spring 23 being attached to the members of the brake band adjacent to their free ends. The position of the slidable block with respect to the parallel surfaces 14, 15, at the free ends of the members of the divided brake band, is such that the movement of the rock shaft in a direction to swing the block down toward a horizontal position will expand the brake band into its braking engagement with the flange 5 against the tension of the springs 22, 23, and the movement of the rock shaft in a direction to swing the slidable block toward a vertical position will permit the brake band to be brought into its contracted or released position by said springs.

The expanding brake band and its operating mechanism are housed within the flange 5 and protected from exposure to the elements, dust, dirt or other foreign matter, by providing a cap 24, the circumferential flange 25 of which overlaps the flange 5 of the hub. This cap 24 has a central opening through which the spindle 3 of the axle projects. It also has openings through which the pivot bolt 8 and the rock shaft 9 project. The cap is secured to laterally extended arms 26, 27, of the bracket 6 by bolts 28, 29. It is also secured at the rock shaft 9 between the flange 20 of the spool 19 and a nut 30 having a screw threaded engagement with the sleeve 9*. By supporting the divided brake band from the drop axle and bracket, the wheel may be removed and inserted without disturbing the brake band and its operating parts. Furthermore, the slidable block 18 serves to tie the spool onto the rock shaft and the rock shaft against longitudinal movement and the free ends of the brake band against lateral movement.

It will be seen that the mounting of the rock shaft 9 in the uprising portion 2 of the drop axle provides a rigid and strong bearing for the said rock shaft. It will also be seen that by the use of the slidable block 18, the wear upon the brake band will not affect its braking action and also that the sliding movement of the block will permit it to equalize its effort upon both of the members of the divided brake band and thereby insure a continuous and even braking effect upon the flange 5. It will also be seen that any rattling of the brake mechanism is obviated by reason of the fact that the springs 22, 23, hold the free ends of the slidable block in the diagonally opposite corners formed in the free ends of the brake band members.

It is evident that various changes might be resorted to in the form, construction and arrangement of the several parts without departing from the spirit and scope of my invention; hence I do not wish to limit myself strictly to the structure herein set forth, but

What I claim is:

1. In a brake mechanism, a cylindrical braking surface, a divided brake band, a rock shaft interposed between the free ends of the brake band members, a spool on said rock shaft, having its flanges overlapping the ends of the brake band members for holding them in position and a block slidable transversely through alined slots in the rock shaft and spool and engaging said free ends of the brake band members.

2. In a brake mechanism, a cylindrical braking surface, a divided brake band, a rock shaft interposed between the free ends of the brake band members, a spool on said rock shaft, having its flanges overlapping the ends of the brake band members for holding them in position and a block slidable transversely through alined slots in the rock shaft and spool and engaging said free ends of the brake band members, said slidable block serving to lock the spool to the shaft.

3. In a brake mechanism, a cylindrical braking surface, a divided brake band, a rock shaft interposed between the free ends of the brake band members, a spool on said rock shaft, having its flanges overlapping the ends of the brake band members for retaining them in position and a block slidable through alined slots in the rock shaft and spool and engaging said free ends of the brake band members, said slidable block serving to lock the rock shaft against longitudinal movement and the spool to the rock shaft and thereby hold the free ends of the brake band against lateral movement.

4. In a brake mechanism, a cylindrical braking surface, a divided brake band having the free ends of its members provided with oppositely arranged parallel surfaces and transverse flanges, a rock shaft interposed between said surfaces and a transversely slidable block carried by the rock shaft and held in position when the brake band is released by its engagement with the corners formed by said parallel surfaces and flanges.

In testimony that I claim the foregoing as my invention, I have signed my name in presence of two witnesses, this 9th day of October 1911.

WILLIAM H. DOUGLAS.

Witnesses:
F. GEORGE BARRY,
OTTO W. HOLMGREN.